United States Patent [19]

Derowitsch

[11] Patent Number: 4,778,006

[45] Date of Patent: Oct. 18, 1988

[54] PROCESS FOR REMOVING CARBONATE FROM WELLS

[76] Inventor: Richard W. Derowitsch, 3168 Twin Lakes La., Sanibel, Fla. 33957

[21] Appl. No.: 46,587

[22] Filed: May 4, 1987

[51] Int. Cl.[4] .............................................. F21B 43/27
[52] U.S. Cl. ..................... 166/267; 166/307; 166/312; 252/8.552; 252/8.553
[58] Field of Search ............... 166/266, 267, 307, 312, 166/902; 252/8.552, 8.553

[56] References Cited

U.S. PATENT DOCUMENTS

| | | | |
|---|---|---|---|
| 2,059,459 | 6/1936 | Hund et al. | |
| 2,124,530 | 6/1936 | Loomis et al. | |
| 2,787,326 | 4/1957 | Hughes | 166/312 X |
| 2,964,109 | 12/1960 | Martin | 166/312 X |
| 3,528,503 | 7/1968 | Crowe | 166/300 |
| 3,651,868 | 7/1970 | Caudle et al. | 166/307 |
| 3,915,234 | 10/1975 | Pelofsky | 166/307 |
| 3,954,636 | 5/1976 | Crowe et al. | 166/307 X |
| 4,051,901 | 10/1977 | Sarem et al. | 166/292 X |
| 4,250,965 | 2/1981 | Wiseman, Jr. | 166/307 X |
| 4,462,713 | 7/1984 | Zurcher et al. | 166/267 X |
| 4,541,488 | 9/1985 | Gomory et al. | 166/307 |
| 4,670,157 | 6/1987 | Nicksic | 166/266 X |

OTHER PUBLICATIONS

Collier's Encyclopedia, vol. 5 (1986), *Calcium*, p. 122.
Encyclopedia Americana, International Edition (1983), *Calcium Carbonate*, p. 160.
The New Encyclopedia Brittanica (15th Ed. 1985), vol. 16, *Continental Landforms*, pp. 791–793.

*Primary Examiner*—George A. Suchfield
*Attorney, Agent, or Firm*—Warren L. Franz

[57] ABSTRACT

A process of removing carbonates from a wall of a water collection and treatment system injects carbon dioxide into "aggressive" water obtained prior to the end of the water treatment process to form aqueous carbonic acid solution which is pumped into the well to react with the carbonate deposits to form bicarbonate solutions which are pumped from the well. A preferred embodiment forms the acid solution with the product of a reverse osmosis desalinization water treatment step. Another embodiment forms the solution with the product of a softening step.

7 Claims, 1 Drawing Sheet

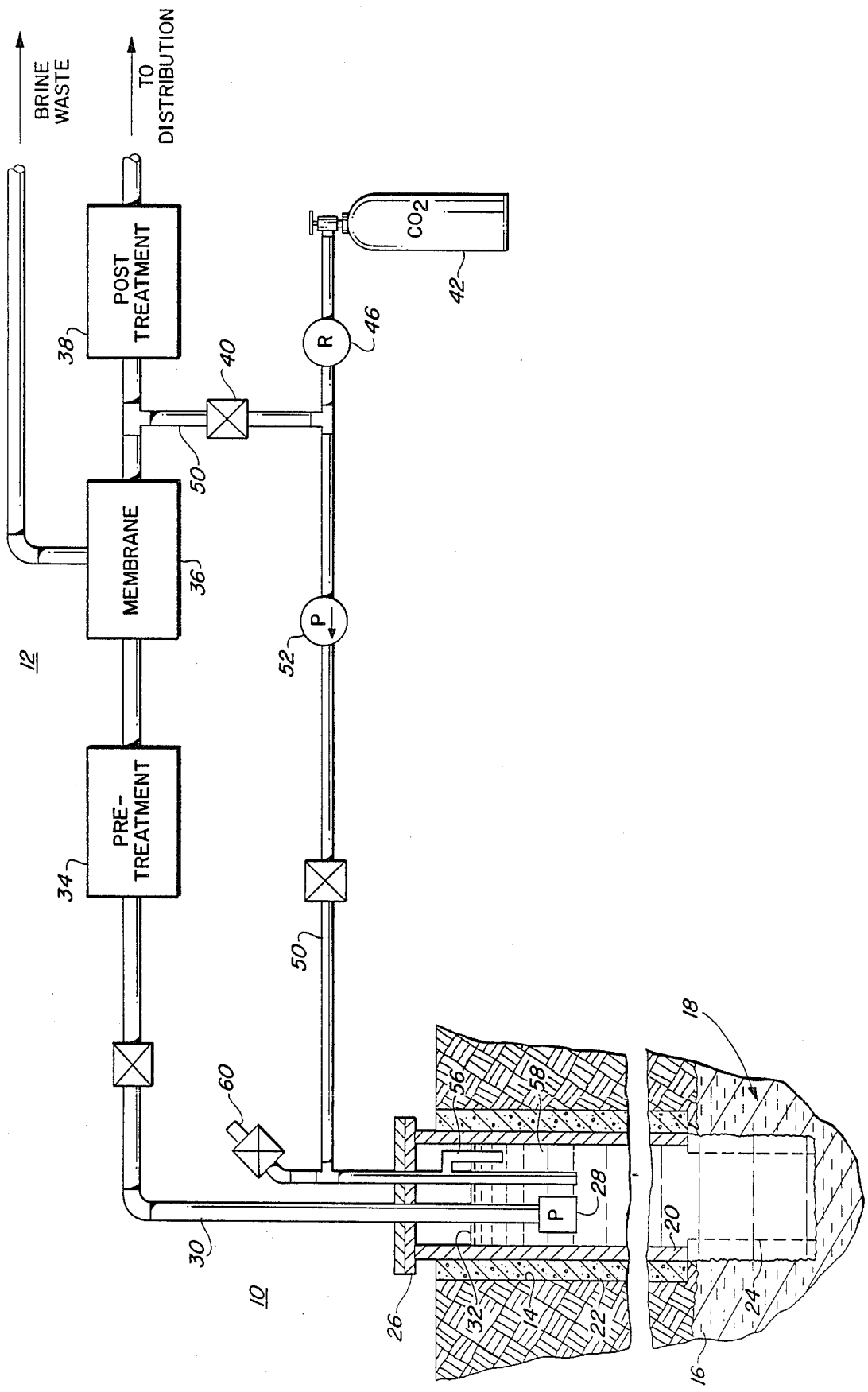

PROCESS FOR REMOVING CARBONATE FROM WELLS

This invention relates to a process for removing carbonate deposits from wells, especially from water wells which connect to water treatment facilities.

BACKGROUND OF THE INVENTION

Groundwater is used as a source of water supply for much of the United States. Such water is typically drawn from underground deposits of unconsolidated granular materials, like sand and gravel, and from passages of sedimentary rocks, like limestone. Collection often involves pumping the water from the ground by means of a submersible or other pump through a well which extends from the Earth's surface down to the level of a water-bearing stratum or aquifer. The part of the well borehole above the aquifer is frequently covered with concrete and steel casing or similar structure to support the walls and prevent contamination of the water source by surface pollutants. The use of PVC has replaced steel as a casing material in the construction of most new water wells. Screens are sometimes fitted where the water flows into the well to prevent the inflow of loose materials from filling the well and clogging the system. Water wells may be public or private and serve to supply water for general household purposes, irrigation, livestock rearing, manufacturing, and other various uses.

After extraction from the well, the water is treated to bring it into conformity with required standards of purity. The water may be subjected to physical treatments to remove particulates and may also be exposed to chemicals to cause disinfection, oxidation and coagulation. The manner and degree of treatment will depend on the source of the water and its intended end use. For home use, attention must be paid to ensuring acceptable color, taste, odor and turbidity, as well as to the removal of pathogenic bacteria and harmful pollutants. Care must also be taken to assure a proper level of pH (acidity or alkalinity).

"Hard" waters, which are those having high calcium or magnesium content, are usually subjected to a softening procedure. One way of softening is to add lime and soda ash to cause calcium carbonate and magnesium hydroxide precipitation. This leaves the waters unstable, however, so that stabilization by recarbonation or other means is performed following treatment. Other softening methods include exposing the waters to zeolites (hydrated aluminum silicates) and passing the waters through ion exchange resins.

Where the groundwater supply is brackish, the treatment process typically includes a desalinization (desalting) step to render the saline water potable. Desalinization may be accomplished by distillation, electrodialysis, reverse osmosis, freeze-separation, hydration crystalization, or solvent-demineralization by ion exchange. In the reverse osmosis process, desalting is brought about by applying pressure to permit the passage of water through semipermeable membranes while impeding the passage of salt ions. (This is a reversal of the normal electrodialysis process in which electric current draws the salt ions through the membranes, leaving the desalted water.)

It is quite common, especially in deep water wells, for calcium and magnesium carbonate to be deposited in the water intake zone of the borehole by water flowing into the well. Although this phenomenon proceeds at a much greater rate, it is not unlike the deposition of calcium carbonate that results in the stalagmite and stalagtite formations of limestone caves.

As groundwater moves through the host rock it is in contact with minerals, such as limestone (calcium carbonate), for a long time. Chemical dissolution takes place and the water moves together with dissolved mineral salts in chemical equilibrium toward the borehole. At the reservoir/well interface, the equilibrium is disrupted by the sudden change in pressure and precipitation of insoluble material (viz. calcium carbonate) results. The rate of carbonate deposition is related to water quality and to borehole entrance velocities during pumping.

With the passage of time, carbonate buildup in the well can begin to seriously interfere with water production. Water drawn from the well is replenished by new water from the cracks and fissures of the water-bearing stratum. If water is drawn from the well at a faster rate than the rate at which water from the stratum replaces it, the static water level in the well is lowered, and a condition known as "drawdown" exists. Severe drawdown can burn out the pump and shut down the treatment plant. Permeability reduction of the well caused by calcification, and particularly the build-up of calcium and magnesium carbonates in the region of the reservoir-well interface, is a leading cause of well drawdowns in deep water wells.

Well performance may be quantified in terms of well "specific capacity," which is the well discharge rate per unit of drawdown, expressed as gpm/ft. Carbonate removal is essential to restoring well specific capacity that has been unacceptably reduced by calcification.

Conventional techniques for removing carbonate from wells involve the pumping of strong concentrated acid (usually hydrochloric acid) into the well, allowing the acid to react with the formation for several hours, and then flushing the spent acid from the well. The results are not always effective due to the uneven distribution of acid within the well. Moreover, such procedures create the potential for serious injuries. The concentrated acid and its fumes can burn the skin and lungs. The acid can easily dissolve many types of pipe fittings, creating dangerous spills. Furthermore, fumes generated during treatment build up quickly and can cause large explosions if not properly vented. Accordingly, special crews and equipment are needed. Also, as a safety precaution, the fire department and/or emergency medical service are usually called to stand by to be able to flush spills and treat injuries.

The special crews and equipment, care in shipping and handling, and the attendant dangers makes the conventional carbonate removal process very costly, especially for rural community water supply organizations whose budget does not justify maintaining such resources in-house. It is not uncommon for such organizations to have to spend over $13,000 per well, two or more times per year.

SUMMARY OF THE INVENTION

It is an object of the present invention to overcome the above and other drawbacks of the prior art by providing a process for removing carbonate deposits from water wells, utilizing a weak acid.

It is a further object of the present invention to provide a safe and inexpensive process for removing carbonate deposits from wells that does not require special crews and equipment.

In one aspect of the invention a process for removing carbonate deposits from wells involves injecting carbon dioxide into a supply of water to form carbonic acid which is delivered to react in the well-bore with the deposits.

In another aspect of the invention, the carbonic acid is formulated using a supply of water which has been treated to place it in an "aggressive" state, so that the resulting aqueous acid solution has an acute affinity for the well deposit material. In this context, the term "aggressive" means that the water has a very low mineral content. This low mineral content creates a condition where the water is continually trying to pick up and retain additional minerals. This phenomenon is exhibited by pure distilled water which is difficult to keep because it is constantly trying to absorb additional minerals. Thus, there are two chemical characteristics of the resulting carbonic acid solution which contribute to its ability to remove the calcium carbonate from the well. The carbonic acid reacts with and dissolves the calcium carbonate and the low mineral content keeps the dissolved material in solution.

A preferred embodiment of the invention, described in greater detail below, utilizes carbonic acid formed by injection of carbon dioxide into RO permeate (water removed from a reverse osmosis water treatment process after a membrane desalinization step, but before the water is rebalanced.) The acid is pumped downhole to dissolve calcium carbonate deposits and the resulting solution of calcium and bicarbonate is flushed from the well by water until the monitored precipitate is clear. An alternative embodiment utilizes carbonic acid formed with water removed after a water softening step but before recarbonization.

BRIEF DESCRIPTION OF THE DRAWING

Embodiments of the invention have been chosen for purposes of illustration and description, and are discussed below with reference to the accompanying drawing which is a schematic view of a well water supply and treatment installation to which the process of the present invention can be applied.

DESCRIPTION OF THE PREFERRED EMBODIMENT

For illustrative purposes, the process of the invention is described as it relates to a simplified water system of the type used to supply a small community with water from a brackish water well for general household purposes. As shown in the drawing, the system includes a water well 10 and a water treatment facility 12.

The well 10 is of a deep well type having a borehole 14 drilled to a depth of 600-800 ft. below the Earth's surface to intersect a water-bearing stratum or aquifer 16. The wall of the borehole 14 from the surface of the well to a water intake zone 18 which extends 30-100 ft. above the bottom of the borehole 14 is covered with a steel casing 20 kept in place by means of a cement layer 22 formed between the casing 20 and the wall. The reservoir-well interface portion 18 at which water enters the well 10 is fitted with a metal screen liner 24. The top of the well 10 is capped at the Earth's surface by means of a wellhead 26.

Groundwater flows from the stratum 16 through the screen lining 24 into the well 10, from which it is drawn to the surface by means of a submerged pump 28 via a stainless steel discharge (drop) pipe 30 which projects through the wellhead 26 into the well to a point below the well static water level 32. The pump 28 moves water through the pipe 30 from the well 10 for delivery to the water treatment facility 12.

The illustrated water treatment facility 12 comprises a pre-treatment system 34, a membrane system 36, and a post-treatment system 38. A simple treatment plant 12 for processing brackish water drawn from a relatively pure source can comprise little more than filters for removal of solids and chlorinators for disinfecting. If needed, specific chemical processes can be added to remove known pollutants, and a softening process (such as a lime and soda ash process) can also be incorporated in order to remove a high content of calcium and magnesium salts. It will, of course, be appreciated that the simplified treatment plant 12 is shown merely by way of example and that the process of the invention can also be applied to more complex facilities whose treatment equipment is far more sophisticated and involves numerous other physical and chemical processing steps.

The simplified plant 12 shown in the drawing has a membrane system 36 for the treatment of brackish water that utilizes a reverse osmosis desalinization step in which water is brought in contact with a semipermeable membrane. Pressure is applied to the water to permit water to pass through the membrane but impede the passage of ions. The fresh water is then passed on to the post-treatment station 38 before being distributed for public consumption, and the brine waste is separately discharged, as indicated.

After passing through the pre-treatment system 34 and the membrane system 36, the water is in a highly "aggressive" state. The chemical and membrane separation processes to which the water has been subjected as part of its treatment leaves the water in a state of chemical inequilibrium and ion imbalance. Where softening has been conducted, the water is extremely soft and unstable. The pH is also typically less than 5.0. Accordingly, recalcification and other treatments for stabilization and pH control are performed at the post-treatment system 38, as necessary to remove the "aggressive" quality and restore a stable, neutral and properly balanced water quality, before passing the water on for distribution and consumption. Where, as in this example water system, the water is intended for household use, the post-treatment system 38 will provide additives, such as sodium hydroxide, and will make adjustments as needed for color, taste, odor, turbidity and softness. The post-treatment system 38 may also include a fluoridation step.

Water drawn from the well 10 by means of pump 28 and discharge pipe 30 for delivery to the treatment facility 12 is replenished by new water from the intake and recharge passageways of the stratum 16. As calcification occurs at the reservoir/well interface 18, the specific capacity of the well 10 diminishes.

In accordance with the principles of the invention, a weak acid solution is delivered into the borehole 14 for removal of built-up carbonate deposits and restoration of the well specific capacity. The well 10 is removed from the supply system and set off-line. Water diverted by means of a valve 40 from the water treatment facility 12, at a point following the membrane system 36 but before the post-treatment system 38, is injected with carbon dioxide $CO_2$ from a gas reservoir 42 to form an aqueous solution of carbonic acid:

$$H_2O + CO_2 \rightleftharpoons H_2CO_3.$$

A convenient source 42 of $CO_2$ is a commercially available gas cylinder bottle which is coupled by means of a gas flow regulator 46 to an acid treatment pipe 50 coming from the output of the membrane system 36. The pipe 50 connects through a pump 52 to deliver a flow of carbonic acid solution into the well 10 at an acid solution discharge pipe 56 which extends through the wellhead 26 into the well 10 to a point below the static water level 32. The discharge pipe 56 may be incorporated into a pipe 58 that is used to gain access through the wellhead 26 for purposes of measuring the water level of the well 10 with an electric tape (not shown). The electric tape may be inserted at a separate discharge pipe opening 60 above the surface of the well.

The carbonic acid solution is pumped into the well 10 at pipe 56. When the carbonic acid reaches calcium carbonate in the well, free calcium and bicarbonate are formed in solution:

$$H_2CO_3 + CaCO_3 \rightleftharpoons Ca + 2HCO_3.$$

The equation is similar for magnesium carbonate. The resulting solution is flushed from the well 10 using the submerged pump 28 and discharge pipe 30. The water drawn from the well is monitored until clear, at which point the well 10 can be returned to service.

The details of a specific implementation of the process of the invention are set forth below:

LABORATORY TEST

A laboratory evaluation was performed as a preliminary measure. The first step was to determine how low the pH of reverse osmosis (RO) permeate could be driven by the addition of $CO_2$.

Degasified product water from a FilmTec$^{TM}$ RO pilot plant was saturated with varying amounts of $CO_2$. The pH of the product water before the addition of $CO_2$ was 6.9. With the addition of 2 CFH of $CO_2$ per gpm of product water the pH was lowered to 4.8. The pH did not reduce beyond this point by increasing either the dosage rate or the contact time.

The second step was to determine if the acidified water was aggressive enough to substantially erode calcium carbonate. A drill cutting sample of the formation was obtained from the recent underreaming of a well. The sample was first rinsed to remove the fines, leaving only the larger pieces in an attempt to simulate the formation. The sample was separated into equal amounts and placed into identical beakers. One beaker was continually flushed with the acidified water, the other beaker was continually flushed with untreated well water. The test was run for 12 hours and repeated three times, each time using fresh formation samples. Each test produced the same results. The sample being flushed with well water was basically unchanged while the sample being flushed with the acidified water was slightly reduced in volume. Most of the smaller particles were eliminated leaving only the larger particles, thereby giving the sample a coarser appearance. An increase of 15 to 20 ppm of calcium and an increase of approximately 0.8 in pH was observed in the acidified water after flushing. The well water was unchanged.

EXAMPLE 1

A small amount of acidified water was pumped down a well, such as shown in the drawing, to determine if an improvement in specific capacity could be obtained. The well 10 was 696 ft. deep and had a water intake zone of 35 ft. No screen liner 24 was used. The particular well was selected because it had a poor specific capacity and was temporarily out of service.

The pump 28 employed was a 40 HP, 460 volt, 525 gpm submersible well pump connected to deliver water to a discharge pipe 30 made up of a 5-inch stainless steel vertical section connecting to a 6-inch PVC pipe horizontal section. The water treatment plant 12 used the same FilmTec$^{TM}$ RO brackish water treatment process in its membrane system 36 as that from which water was drawn for the experiment, above. A tap was installed in the product water line after the RO membranes 36 and before the post-treatment system 38, to divert ion unbalanced water from point 40 through a salvaged pump 52 to the well 10 to be treated. The acid treatment pipe 50 used was a 2-inch PVC pipe which connected below a 1-inch PVC access port 60 to a 1-inch PVC pipe 58 suitable for guiding electric tape into the well 10 and having a discharge point 140 ft. down from the well surface at the same level as the intake of the pump 28. A discharge pipe 56 extending down from the pipe 58 to a discharge point 18 ft. from the well surface below the static water level 32 was a 1-inch PVC pipe, used to reduce pipe resistance and increase the flow of carbonic acid solution into the well 10.

A commercially available cylinder source of compressed $CO_2$ gas 42 was connected through a regulator 46 to the pipe 50 so that $CO_2$ was injected on the suction side of the pump 52 at the ratio of 2 cu.ft. per hour per gpm of water. Care was taken to avoid freeze-up of the regulator 46. This was accomplished by continuously running a small stream of water over the regulator. The $CO_2$ was fed at 15 CFH and the acidified water was pumped at 7.5 gpm.

The amount of carbonic acid being generated was monitored by watching the pH of the solution at the wellhead 26 in order to keep the pH of the solution at the wellhead 26 at approximately 2 units lower than the pH of the water prior to $CO_2$ injection. The diameter and the length of pipe 50 was chosen to ensure that the contact time between the $CO_2$ and the water before entering the wellhead 26 was 6 minutes or longer.

After approximately 60,000 gallons were pumped, a well test was run. The results were compared to a test which was run just prior to the treatment. An improvement of 0.30 gpm/ft in specific capacity was observed. The treatment was repeated a second time and an improvement of 0.19 gpm/ft in specific capacity was observed.

The final step was to use a larger pump 52 and to treat the well with a greater volume of acidified water. The rate was 60 CFH of $CO_2$ in 29 gpm of acidified water. Three additional treatments of approximately 700,000 gallons total were done. An improvment of 4.92 gpm/ft in specific capacity was observed.

Base Line
Day 1
006310 meter reading
Aquifer being pumped at 1575 gpm
5.93 specific capacity

| Time | Water above Pump (feet) | Pumping Rate (gpm) |
|---|---|---|
| 13:56 | 134.8 | 0 |
| 14:00 | 58.5 | 500 |
| 16:15 | 52.1 | 500 |
| 17:10 | 51.4 | 500 |
| 18:25 | 50.7 | 500 |
| 20:00 | 50.5 | 500 |

1st Treatment
Day 8
067140 meter reading
Aquifer being pumped at 1575 gpm
15 CFM $CO_2$
pH 4.67
7.5 gpm acid solution
60,830 gallons pumped
.30 gpm/dd specific capacity improvement
6.23 specific capacity

| Time | Water Above Pump (feet) | Pumping Rate (gpm) |
|---|---|---|
| 14:05 | 134.5 | 0 |
| 14:15 | 62.8 | 500 |
| 15:20 | 58.0 | 500 |
| 16:30 | 55.6 | 500 |
| 19:00 | 54.5 | 500 |
| 20:30 | 54.3 | 500 |

2nd Treatment
Day 15
127039 meter reading
Aquifer being pumped at 1575 gpm
15 CFM $CO_2$
pH 4.70
7.5 gpm acid solution
59,899 gallons pumped
.19 gpm/dd specific capacity improvement
6.42 specific capacity

| Time | Water Above Pump (feet) | Pumping Rate (gpm) |
|---|---|---|
| 8:49 | 134.2 | 0 |
| 8:55 | 65.0 | 500 |
| 10:41 | 60.1 | 500 |
| 12:10 | 58.3 | 500 |
| 12:45 | 57.9 | 500 |
| 15:17 | 56.4 | 500 |

3rd Treatment
Day 44
650070 meter reading
Aquifer being pumped at 1575 gpm
60 CFM $CO_2$
pH 4.51
29 gpm acid solution
523,031 gallons pumped
2.75 gpm/dd specific capacity improvement
9.17 specific capacity

| Time | Water Above Pump (feet) | Pumping Rate (gpm) |
|---|---|---|
| 10:04 | 132.7 | 0 |
| 10:12 | 88.6 | 500 |
| 10:16 | 87.5 | 500 |
| 10:20 | 86.3 | 500 |
| 10:26 | 84.5 | 500 |
| 10:48 | 82.3 | 500 |
| 12:00 | 79.1 | 500 |
| 13:31 | 78.1 | 500 |
| 14:41 | 78.0 | 500 |
| 15:41 | 78.2 | 500 |

4th Treatment
Day 50
806740 meter reading
Aquifer recovered
60 CFM $CO_2$
pH 4.73
29 gpm acid solution
156,670 gallons pumped
1.79 gpm/dd specific capacity improvement
10.96 specific capacity

| Time | Water Above Pump (feet) | Pumping Rate (gpm) |
|---|---|---|
| 13:41 | 163.9 | 0 |
| 13:46 | (discoloration) | |
| 13:53 | 125.2 | 500 |
| 13:56 | (clear) | |
| 13:57 | 124.3 | 500 |
| 14:04 | 123.5 | 500 |
| 15:22 | 120.3 | 500 |
| 16:59 | 118.8 | 500 |
| 18:11 | 118.5 | 500 |
| 19:21 | 118.3 | 500 |

5th Treatment
Day 57
869300 meter reading
Aquifer being pumped at 1575 gpm
60 CFM $CO_2$
pH 4.62
29 gpm acid solution
62,560 gallons pumped
.38 gpm/dd specific capacity improvement
11.3 specific capacity

| Time | Water Above Pump (feet) | Pumping Rate (gpm) |
|---|---|---|
| 10:04 | 134.3 | 0 |
| 10:07 | 86.6 | 700 |
| 10:08 | (discoloration) | |
| 10:09 | 82.9 | 700 |
| 10:12 | 81.4 | 690 |
| 10:13 | (clear) | |
| 10:27 | 98.6 | 500 |
| 11:35 | 94.2 | 500 |
| 12:54 | 92.1 | 500 |
| 16:48 | 90.2 | 500 |

SUMMARY OF EXAMPLE

| | Drawdown 500 gpm (feet) | Specific-Capacity (gpm/ft) | Acidified Water Pumped (gallons) |
|---|---|---|---|
| Base Line | 84.3 | 5.93 | 0 |
| 1st Treatment | 80.2 | 6.23 | 60830 |
| 2nd Treatment | 77.8 | 6.42 | 59899 |
| 3rd Treatment | 54.5 | 9.17 | 523031 |
| 4th Treatment | 45.6 | 10.96 | 156670 |
| 5th Treatment | 44.1 | 11.34 | 62560 |

OTHER EXAMPLES

Six additional experiments were conducted to evaluate different flow rates and volumes. A total of four different sample wells, each having different water qualities and formations were selected. The time required to complete the process was determined to be a function of the volume of solution pumped into the well and the amount of build-up within the formation. The additional experiments are summarized as follows:

| Well | Specific Capacity (gpm/ft) Before Treatment | After Treatment | Acidified Water Pumped (gallons) |
|---|---|---|---|
| S1 | 5.756 | 10.392 | 900,000 |
| S3 | 5.122 | 8.081 | 1,259,870 |
| S1 | 7.246 | 11.241 | 1,071,507 |
| S2 | 9.009 | 10.905 | 1,327,820 |
| S3 | 6.550 | 10.260 | 2,000,000 |
| S4 | 3.36 | 21.05 | 2,336,430 |

From the foregoing it can be seen that, applying the invention, carbonate deposits are removed through usage of a weak, readily manufacturable acid by a process requiring no special equipment and presenting no extreme safety hazard. The process can be conducted with minimal training and at little cost, thereby lending itself to use by even the smallest water supply organizations.

The invention process, because of the larger volumes of acid solution applied at a steady rate over a longer period of time, provides a more complete coverage than conventional techniques of the area to be treated. The solution reaches further into all areas of the borehole and the formation, so that a thorough etching of the buildup is accomplished. The higher pH of the carbonic acid solution compared with the concentrated acids used in conventional techniques greatly reduces the risk of personal injury and the danger of a spill. The carbonic acid solution is relatively harmless to the skin, and does not generate dangerous fumes. The need for standby emergency personnel is thus alleviated.

It will be appreciated that while the described embodiment is shown in connection with a simplified water treatment facility 12 for treating brackish water, the same benefits and advantages of the invention may be obtained where other and more complex treatment processes are employed, or where no water treatment facility is attendant at all. Also, a portable unit to render the water into an aggressive state could be constructed by installing a small RO treatment system in a trailer. Another well, a lake, a municipal water hookup, or any other locally available water source could be used to supply the water for the process. An activated carbon pretreatment could be done and the unit could be run with power available at the wellhead. Carbon dioxide could be injected, for example, from cylinders installed in another trailer.

Further, although the water used for constituting the carbonic acid in the embodiment described above is drawn from a point in the treatment system following desalinization, other points from which to draw the water are also suitable, as from other membrane processes or other chemical reactions which also render the water in an aggessive state in which it is keen to take on carbonates. In treatment processes utilizing a lime and soda ash softening technique, for instance, the softened water is especially aggressive and eager to take on carbonates. Such water, in fact, normally requires recarbonation or other stabilization prior to distributing it to consumers. Formation of carbonic acid with the product of such a softening treatment will thus also give the benefits of this invention. An alternative to the embodiment described above is, therefore, to divert water from a point 40 of a water treatment plant 12 located between the output of a softening step, which can be in the pretreatment system 34 or membrane system 36, and the input to a recarbonation step, which can be in the post-treatment system 38. Various other substitutions and modifications may also be made without departing from the spirit and scope of the present invention as defined by the claims appended hereto.

What is claimed is:

1. A method of removing carbonate deposited in a water supply well by inflowing groundwater, comprising the steps:
    treating a supply of water by means of a process that gives the water a keen affinity for carbonate;
    introducing carbon dioxide into the treated supply of water, without restabilization, to form an aqueous solution of carbonic acid;
    pumping the solution into the well to react with the deposited carbonate; and
    flushing the product of the reaction from the well.

2. A method as in claim 1, wherein the process in the treating step comprises a water softening process; and the treated supply of water in the introducing step comprises a supply of water that has been softened in the water softening process, but not recarbonized.

3. A method as in claim 1, wherein the process in the treating step comprises a membrane water desalinization process; and the treated supply of water in the introducing step comprises a supply of water that has been placed in a state of chemical inequilibrium and ion imbalance by the membrane process, but not restabilized.

4. A method as in claim 3, wherein the membrane process in the treating step comprises a reverse osmosis process; and the treated supply of water in the introducing step comprises reverse osmosis permeate.

5. A method as in claim 4, wherein the introducing step comprises introducing carbon dioxide into the treated supply of water at a rate of 2 cu. ft. per hour of carbon dioxide per gpm of water.

6. A method as in claim 5, wherein the introducing and pumping steps are coordinated so that the contact time between the carbon dioxide and the treated water before entering the well is 6 minutes or longer.

7. A method as in claim 6, wherein the pH of the soluion supply when it enters the well is 2 units lower than the treated water supply.

* * * * *